3,254,954
PROCESS FOR PREPARING DIBORANE

Eugene C. Ashby, Baton Rouge, La., assignor to Ethyl Corporation, New York, N.Y., a corporation of Virginia
No Drawing. Filed Mar. 29, 1963, Ser. No. 269,850
6 Claims. (Cl. 23—204)

This invention relates to a novel and improved method for the preparation of diborane.

In the past a number of methods have been proposed for the preparation of diborane.

The original method of Stock and Massenez, Ber. 45, 3539 (1912), involved treating magnesium boride, $Mg_3B_2$, with acid. This yields $B_4H_{10}$, tetraborane, from which a mixture of boranes rich in diborane can be obtained by heating to 100° C. From this mixture the diborane was separated by fractionation.

Another method is that of Schlesinger and Burg, J. Am. Chem. Soc., 53, 4321 (1931), wherein hydrogen at about 20 mm. of mercury pressure is mixed with a tenth of its volume of boron trichloride or (preferably) boron tribromide and exposed to a discharge of about 15,000 volts; the products, which are condensed with liquid air, are mainly composed of $B_2H_5X$ but, on letting them warm up to 0° C., this is almost completely converted into $B_2H_6+BX_3$. The diborane is then separated by fractionation from the boron trihalide.

Both the above processes are characterized by the use of complex equipment and by the need for extreme care in manipulation. The products are mixtures of boranes which must be separated by careful fractionation to yield the desired product and, in view of the high chemical reactivity of the boranes, the difficulties involved are evident.

The most used method at the present time is that of Finholt, Bond and Schlesinger, J. Am. Chem. Soc., 69, 1199 (1947), wherein lithium aluminum hydride is combined with an excess of pure boron chloride in ether solution. The boron chloride etherate first formed reacts at room temperature with the lithium aluminum hydride to form diborane in essentially quantitative yield.

This method, while an improvement over previous methods, suffers from the economic disadvantage that both the lithium aluminum hydride and boron halide reactants are relatively expensive materials.

Accordingly, it is an object of the present invention to provide a novel method for the preparation of diborane. Another object is to provide a method for the preparation of diborane in high yield and purity. Another object is to provide a method of preparing diborane from relatively inexpensive raw materials. Still another object is to provide a method for the preparation of diborane which shall not be subject to the difficulties of equipment and manipulation characteristic of earlier methods. Still other objects will appear hereinafter.

It has now been found that these and other objects are accomplished by the process which involves pyrolyzing, under an inert atmosphere and at a pressure not in excess of 40 mm. of mercury, a tertiary amine borane of the general formula $H_3BNRR'R''$ wherein R, R' and R'' are hydrocarbon radicals at least one of which is an aromatic radical. A preferred embodiment comprises the pyrolysis under the above conditions of N,N-dimethyl aniline borane, N,N-diethyl aniline borane or N,N-dimethyl-alpha-naphthyl amine borane. This embodiment is preferred because the named compounds decompose smoothly, readily and at relatively low temperatures to produce diborane. Still another embodiment involves carrying out the pyrolysis at a pressure of from about 0.01 to about 40 mm. of mercury and at a temperature of from about 80 to about 105° C., the reactants and products being protected by an inert atmosphere consisting of dry nitrogen, hydrogen, helium, neon, argon, krypton, xenon, or other gas inert with respect to reactants and products.

Still another embodiment is a two-stage process wherein, in the first stage, a tertiary amine borane of the general formula $H_3BNR_aR_bR_c$, wherein $R_a$, $R_b$ and $R_c$ are alkyl hydrocarbon radicals, is reacted with a tertiary amine of the general formula NRR'R'', where R, R' and R'' are hydrocarbon radicals at least one of which is an aromatic radical, to yield by transamination a tertiary amine borane product, less stable thermally than the original tertiary amine borane, of the general formula $H_3BNRR'R''$ and which, in the second stage, is pyrolyzed under an inert atmosphere and at a pressure not in excess of 40 mm. of mercury to produce diborane. The foregoing two-stage process is a particularly preferred embodiment because it combines the ease of preparation of amine boranes of highly basic amines with the ease of thermal decomposition of amine boranes of weakly basic amines, the unifying stage being the transamination process which can be used to convert a strongly basic amine borane to a weakly basic amine borane. Thus, the application of the transamination reaction enlarges the scope of this invention by converting easy-to-prepare and hard-to-decompose amine boranes to hard-to-prepare but easy-to-decompose amine boranes, and in the process provides useful amines as by-products. The transamination reaction is an equilibrium reaction which can be made to go in either direction by proper choice of conditions. For example, it can be driven in a desired direction by removing from the sphere of reaction one of the products of the desired reaction.

The invention will be more fully understood by reference to the following illustrative examples in which all parts and percentages are by weight.

EXAMPLE I

*Preparation of triethyl amine borane*

Into a Magne-Dash autoclave were introduced 30 parts of phenyl borate, 100 parts of triethyl amine and 5 parts of aluminum powder, activated by the fine cutting of aluminum metal under an inert solvent. The mixture was then heated to 220° C. with hydrogen at a pressure of 5,000 pounds per square inch for 2½ hours. During that period the pressure dropped to 4,100 pounds per square inch. The product was isolated by filtration of the liquid product (dissolved in the triethyl amine solvent) away from the residue of solid aluminum alkoxide and excess aluminum. The yield of triethyl amine borane was 88.0 percent.

Similar results were obtained with aluminum activated by reacting an excess of aluminum powder with triethylaluminum and hydrogen.

When the above reaction was repeated using a temperature of 180° C., a pressure of 2,000 pounds per square inch, a reaction time of 1 hour, and an aluminum chloride catalyst, a quantitative yield of triethyl amine borane was obtained.

When tri-n-butyl amine, ethyl diisopropyl amine, or dimethyl aniline is used in place of the triethyl amine reactant in the above example, similar results are obtained. Similar results are also obtained when using as solvent dimethyl aniline, diethyl aniline or a mixture of trimethyl amine and benzene and when using as catalysts sodium borohydride, sodium hydride, or nothing.

EXAMPLE II

*Transamination of triethyl amine borane with N,N-diethyl aniline using 100 percent excess amine and no catalyst*

Triethyl amine borane (25 parts) was added to N,N-diethyl aniline (50.7 parts) at room temperature. Triethyl amine first appeared overhead in the distillate at a pot temperature of 125 to 128° C. The solution was then heated to 135° C. at 65 mm. for 24 hours. After this period the pressure was raised to 75 mm. and the temperature rose to 137° C. This temperature was held for an additional 24 hours. The pressure was then raised to 93 mm. and the temperature rose to 139° C. After a 3-day period, 7.7 parts of triethyl amine was collected in the cold trap, representing a 45 percent conversion to N,N-diethyl aniline borane as determined by infrared analysis.

EXAMPLE III

*Pyrolysis of N,N-diethyl aniline borane*

The apparatus consisted of a 10-ml. flask with a 30 cm. neck having a side arm of large diameter near the top. A cold-finger condenser extended from the top of the neck to a point just below the side arm. The condensed material was collected in a second flask and non-condensed material passed overhead to a liquid nitrogen trap closed by a mercury bubbler. A capillary tube could be inserted into the flask through a short neck, thus providing a means for bubbling nitrogen through the liquid sample. A three-way stopcock was sealed to the bottom of the second flask with tubing leading back to the first flask, so that the condensate could be withdrawn from the system or recycled to the first flask.

The pyrolysis apparatus was flashed with dry nitrogen and changed with N,N-diethyl aniline borane and the material was sent through two cycles with the following results:

| Cycle | Amine Borane Concentration, Percent | Temp., °C. | Pressure, mm. | Time, Hr. | Conversion, Percent |
|---|---|---|---|---|---|
| 1 | 97 | 90-95 | 0.8 | 2.09 | 50.0 |
| 2 | 49 | 90-95 | 0.8 | 1.50 | 19.5 |

Overall conversion=59.8%.
Diborane material balance=102.8%.

The N,N-diethyl aniline borane showed a susceptibility to pyrolysis which decreased with increased concentration, but good conversions were obtained at higher pressures. A pyrolysis was carried out at 3.2 to 3.8 mm. At 90 to 95° C., no diethyl aniline distilled over and in 2 hours the conversion to diborne was 23 percent. The temperature was then increased to 118° C. and the residue was distilled over in 1 hour at an overhead temperature of 66 to 67° C. Overall conversion to diborane was 48 percent.

When the experiment of Example III was repeated using nitrogen pressures of 5, 10 and 20 mm., similar results were obtained.

EXAMPLE IV

*Pyrolysis of N,N-dimethyl-alpha-naphthyl amine borane*

N,N-dimethyl-alpha-naphthyl amine borane was prepared by reacting a 50 percent excess of diborane with dimethyl-alpha-naphthyl amine. The product was a clear, thick, viscous liquid. It contained 5.62 percent boron and 7.26 percent nitrogen compared with theoretical values of 5.85 percent and 7.57 percent, respectively. Infrared analysis indicated a purity of 94 percent.

This material was heated to 95 to 100° C. at 0.1 mm. for 2.5 hours. There was no amine reflux so that recombination was limited. The conversion to diborane was 57.6 percent as determined by scrubbing the effluent gas with triethyl amine and measuring, by infrared analysis, the amine borane produced.

EXAMPLE V

*Combination process with 100 percent excess amine an catalyst*

Triisobutylamine borane (199 parts, 1 mole) and N,N-diethyl aniline (149 parts, 2 moles) are combined at room temperature with 2.7 parts (0.02 mole) of anhydrous aluminum chloride catalyst. Triisobutylamine (100 parts) is collected after heating the solution for 6 hours at 140° C. and 100 mm. pressure. When no more triisobutylamine condenses at this temperature, the temperature is raised to 150° C. After 4 hours heating at 150° C., no more triisobutylamine is collected.

The residue from the above reaction, which consists largely of N,N-diethyl aniline borane and unchanged triisobutylamine borane, is charged to the pyrolysis apparatus. 400 parts of isopropyl ether are added, and the mixture is refluxed under nitrogen for 4 hours, the diborane being collected in triethyl amine. A good yield of diborane is obtained.

The above examples have been presented by way of illustration and it is not intended to limit the scope of the invention thereby. The procedures employed therein may be applied to the production of diborane starting with amine boranes and aryl amines other than those disclosed above. Thus, the amine moieties associated with monoborane in the original amine borane reactants may include methyl diethyl amine, dimethyl ethyl amine, diethyl isopropyl amine, tripropyl amine, triisopropyl amine, tri-n-butyl amine, tri-tert-butyl amine, trihexyl amine, trioctyl amine, tridodecyl amine, and the like. The aryl amine reactants may include such compounds as N,N-dimethyl aniline; N-methyl-N-ethyl aniline; N,N-di-n-propyl aniline; N,N-methyl propyl aniline; N,N-dihexyl aniline; N,N-dioctyl aniline; N,N-didodecyl aniline; N,N-diethyl-o-toluidine, N,N-dimethyl p-toluidine, N,N - dimethyl-1,2,3-xylidine, N-methyl-N-ethyl-alpha-naphthyl amine; N,N-dimethyl-beta-naphthyl amine; N,N - dimethyl-(2,3-dimethyl-1-naphthyl)amine; N,N-dimethyl-(1,8-diethyl-2-naphthyl)amine; and the like.

The ratio of the reactants in the transamination reaction may vary from a 100 percent or greater excess of the amine borane to a 100 percent or greater excess of the aryl amine. However, since the reaction is in equilibrium, a moderate excess of the aryl amine, say 20 percent, is desirable for the purpose of increasing the yield of the diaryl amine borane product. Such excess is therefore preferred.

The rate of the transamination reaction can be increased by the use of a catalyst. Such catalysts include anhydrous aluminum halides, such, for example, as aluminum chloride; aluminum alkyls, such as triethyl aluminum; and boron alkyls, such as triethyl borane. Of these, aluminum chloride is preferred because of its economy and availability. The catalysts may be employed in amounts varying from 0.1 percent or less to 10 percent or more by weight, based on the trialkyl amine reactant. Amounts in the range of ½ to 2 percent by weight give very satisfactory reaction rates and are therefore preferred.

The transamination reaction of this invention may be carried out at temperatures ranging from 100° C. or lower to 150° C. or above at pressures ranging from 50 mm. of mercury or below to 110 mm. or above. Temperatures in the range of 140 to 145° C. and pressures in the range of 90 to 100 mm. of mercury are preferred because the reaction proceeds smoothly and rapidly under these conditions. The time required for maximum yield of the desired product may vary from 4 hours or less to 3 days or more, depending upon the particular reactants and conditions employed. Normally no solvent is employed other than an excess of the aryl amine reactant since the rate of reaction is satisfactory under these conditions and the addition of other solvents would serve to dilute the amine and thereby reduce the reaction rate.

The pyrolysis reaction can be carried out at temperatures varying from 70° C. or below to 115° C. or above and at total pressures of inert gas varying from 0.03 mm. or below to 40 mm. or above. In general, pressures of about 0.03 mm. of mercury and temperatures in the range of 80 to 105° C. are preferred because high conversion to diborane is obtained under these conditions. In fact, experimental evidence shows that for certain reactants the percentage conversion falls off very rapidly as the pressure increases. For example, in the case of the pyrolysis of dimethyl aniline borane, the percent conversion to diborane falls off from 14.8 percent at 0.03 mm. to 0.5 percent at 40 mm. pressure. The time required to obtain a maximum yield of diborane varies from 1 hour or less to 6 hours or more, depending upon the particular aryl amine borane and the other reaction conditions. Normally the pyrolysis reaction is carried out in the absence of any solvent but hexane, octane, dodecane, or other hydrocarbons, or isopropyl ether, n-butyl ether, n-amyl ether, or other ethers may be used as carriers for the librated diborane. Furthermore, high-boiling components such as diphenyl methane and triphenyl borate may be added as diluents to reduce the reflux rate.

As indicated above, the pyrolysis can be carried out in an inert atmosphere of dry nitrogen, hydrogen, helium, neon, argon, krypton, xenon, or other gas inert with respect to reactants and products.

The diborane product of the process of this invention is useful as a synthetic reactant in organic chemistry. An example is its use in the hydroboration reaction (H. C. Brown and Subba Rao, J. Am. Chem. Soc., 78, 5694 (1956)). Another example is its reaction with olefins to produce trialkyl boranes for use as catalysts in olefin polymerization or as intermediates in the synthesis of primary alcohols.

Having thus described the novel process for the preparation of diborane, it is not intended that it be limited except as set forth in the following claims.

I claim:
1. A process for the preparation of diborane which comprises pyrolyzing under an inert atmosphere, at a pressure not in excess of 40 mm. of mercury, a tertiary amine borane of the general formula $H_3BNRR'R''$, wherein R is an aromatic hydrocarbon radical containing from 6 to about 14 carbon atoms, and R' and R'' are aliphatic hydrocarbon radicals, each containing from 1 to about 12 carbon atoms.

2. The process of claim 1, characterized in that the tertiary amine borane is selected from the group consisting of N,N-dimethyl aniline borane, N,N-diethyl aniline borane and N,N-dimethyl-alpha-naphthylamine borane.

3. The process of claim 1, characterized in that the pyrolysis is carried out at a pressure of from about 0.01 to about 40 mm. of mercury and at a temperature of from about 80 to about 105° C.

4. The two-stage process for the preparation of diborane which comprises, in the first stage, reacting a tertiary amine borane of the general formula $$H_3BNR_aR_bR_c$$

wherein $R_a$, $R_b$ and $R_c$ are aliphatic hydrocarbon radicals, each containing from 1 to about 12 carbon atoms, with a tertiary amine of the general formula NRR'R'', wherein R is an aromatic hydrocarbon radical containing from 6 to about 14 carbon atoms, and R' and R'' are aliphatic hydrocarbon radicals, each containing from 1 to about 12 carbon atoms, to yield by transamination a tertiary amine borane product of the general formula $H_3BNRR'R''$ and a by-product amine of the general formula $NR_aR_bR_c$, separating said by-product amine from the said tertiary amine borane product and, in the second stage, pyrolyzing said tertiary amine borane product under an inert atmosphere at a pressure not in excess of 40 mm. of mercury to produce diborane.

5. The process of claim 4 wherein the transamination stage is carried out at a pressure of from about 60 to about 110 mm. of mercury and at a temperature of from about 120 to about 150° C. and the pyrolysis stage is carried out at a pressure of from about 0.01 to about 40 mm. of mercury and at a temperature of from about 80 to about 105° C.

6. The process of claim 4, characterized in that the tertiary amine is selected from the group consisting of N,N-dimethyl aniline, N,N-diethyl aniline and N,N-dimethyl-alpha-naphthyl amine.

No references cited.

OSCAR R. VERTIZ, *Primary Examiner.*

REUBEN EPSTEIN, L. A. SEBASTIAN, *Examiners.*

M. WEISSMAN, *Assistant Examiner.*